United States Patent [19]

Barr

[11] Patent Number: 4,549,745

[45] Date of Patent: Oct. 29, 1985

[54] FIFTH WHEEL COUPLER

[76] Inventor: William A. Barr, Gibson Island, Md. 21056

[21] Appl. No.: 664,703

[22] Filed: Oct. 25, 1984

[51] Int. Cl.[4] ............................................ B62D 53/12
[52] U.S. Cl. .................................................... 280/434
[58] Field of Search .............. 280/434, 435, 436, 437, 280/433, 438 R, 438 A, 439, 440, 441, 515, 509

[56] References Cited

U.S. PATENT DOCUMENTS 1,981,233  11/1934  Harris ................................... 280/434
4,455,036  6/1984  Barr ..................................... 280/434

FOREIGN PATENT DOCUMENTS 646631  10/1962  Italy ..................................... 280/434

Primary Examiner—Joseph F. Peters, Jr.
Assistant Examiner—Everett G. Diederiks, Jr.
Attorney, Agent, or Firm—Scrivener Clarke Scrivener and Johnson

[57] ABSTRACT

A fifth wheel coupler having a jaw which is positively driven by a mechanism in response to the movement of a king pin in a coupling direction. The jaw and the mechanism are yieldably connected so as to permit the mechanism to be operated by the oncoming king pin to the full extent of the movement of both, after the jaw has been prevented from further movement due to engagement with an obstruction on the king pin.

7 Claims, 4 Drawing Figures

FIFTH WHEEL COUPLER

This invention relates to fifth wheel couplers and more particularly to fifth wheel couplers of the type in which a jaw member is moved in response to relative movement of a king pin in a coupling direction from a position beside the path of movement of said king pin to a closed and latched position across said path.

Because specifications for king pins (SAE J700b, 1982 SAE Handbook, page 37.19) calls for the diameter of the lower flange to be less than the upper flange, it is possible, due to mispositioning of a trailer landing wheels, for the lower flange rather than he upper one to become seated in the usual recess on the upper end of the closed and latched coupler jaw. When the tractor is initially operated under such conditions the trailer follows in a normal manner but when a bump is encountered on the open highway the king pin can suddenly jump free of the recess resulting in a serious accident. To counter this problem I patented in U.S. Pat. No. 4,455,036 a king pin whose lower flange is of a size predeterminedly greater than the recess so that the jaw cannot move to its closed and latched position around the lower flange and thus a trailer cannot be towed at all until the king pin is properly aligned with the jaw so that it can be moved to its closed and latched position.

The oversized flange, however, can create problems in couplers of the type where the jaw is positively driven across the path of movement of the king pin by some kind of positive drive mechanism, such as a rack teeth on a plunger in engagement with sector gear teeth on a jaw member, the plunger being engageable by the king pin to positively swing the jaw through the rack and sector gear teeth across the path of movement of the king pin as it moves in a coupling direction against the plunger. Such an arrangement is shown in the patent to Harris U.S. Pat. No. 1,981,233 where it can be seen that should the king pin flange, even if not oversized as in my patent, engage the plunger intermediate its ends, the swingable jaw obviously would be prevented by the flange from moving to its closed and latched position while the plunger is driven by the king pin in an attempt to positively force the jaw to close. If the tractor is being backed in the direction of the king pin under high power, either the mechanism must break or the components must be sufficiently rugged that they stall, without breaking.

The object of the present invention is to solve the foregoing problem by interposing between a locking jaw for a king pin and the mechanism which drives it in response to movement of a king pin in a coupling direction, yielding means which, when the jaw is prevented by an obstruction, such as a flange on the king pin from moving to its closed and latched position, yields to permit the mechanism to continue to be operated by the king pin to the full extent of the range of movement of the mechanism or king pin in a coupling direction.

Other objects and their attendant advantages will become apparent as the following detailed description is read in conjunction with the accompanying drawings wherein.

Figure 1:
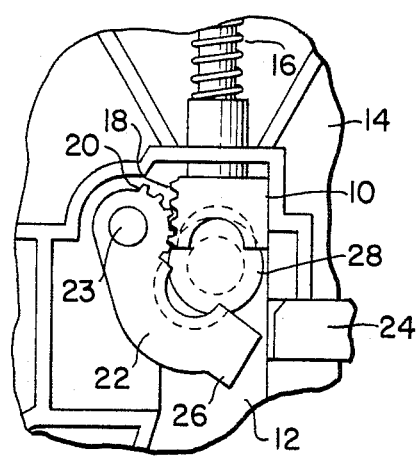
FIG. 1 is a broken view of a prior art coupler presently in widespread use.

Referring now to the prior art coupler of FIG. 1, which is essentially the same as that shown and described in the patent to Harris U.S. Pat. No. 1,981,233, a plunger 10 near the closed end of a slot 12 in a fifth wheel 14 is urged by a spring 16 to an advanced position in the slot. The plunger carries rack teeth 18 on one of its sides which engage gear sector teeth 20 integral with a locking jaw 22 mounted on a pivot 23 at one side of the slot 12. The teeth are so arranged that when the plunger is in its advanced position the jaw is positioned beside the slot but when the plunger is engaged by a king pin moving relatively in a coupling direction, the rack teeth 18 positively drive the jaw through the sector gear teeth 20 across the path of movement of the king pin in a coupling direction towards the closed end of the slot. As the jaw moves past a latch 24 it releases a trigger mechanism (not shown) which drives the latch behind a shoulder 26 on the jaw to releasable retain it in its closed and latched position behind the king pin. The numeral 28 depicts the flange of a king pin which has engaged the plunger intermediate its ends and as the flange drives the plunger towards the closed end of the slot the engaged teeth endeavor to positively drive the jaw in a closing direction but because the jaw cannot close against the flange yet the jaw continues to be positively driven in a closing direction by the oncoming king pin, something has to give, that is to say, either the closing mechanism stalls or the teeth must shear off. If the tractor is being backed towards the king pin with considerable power, usually the teeth shear simply because they are not designed to sustain unusual loads due to the fact that, under normal conditions, the teeth are merely required to swing the jaw across the slot, all loading on the jaw being thereafter sustained by the pivot 23 and latch 24.

Figure 2:
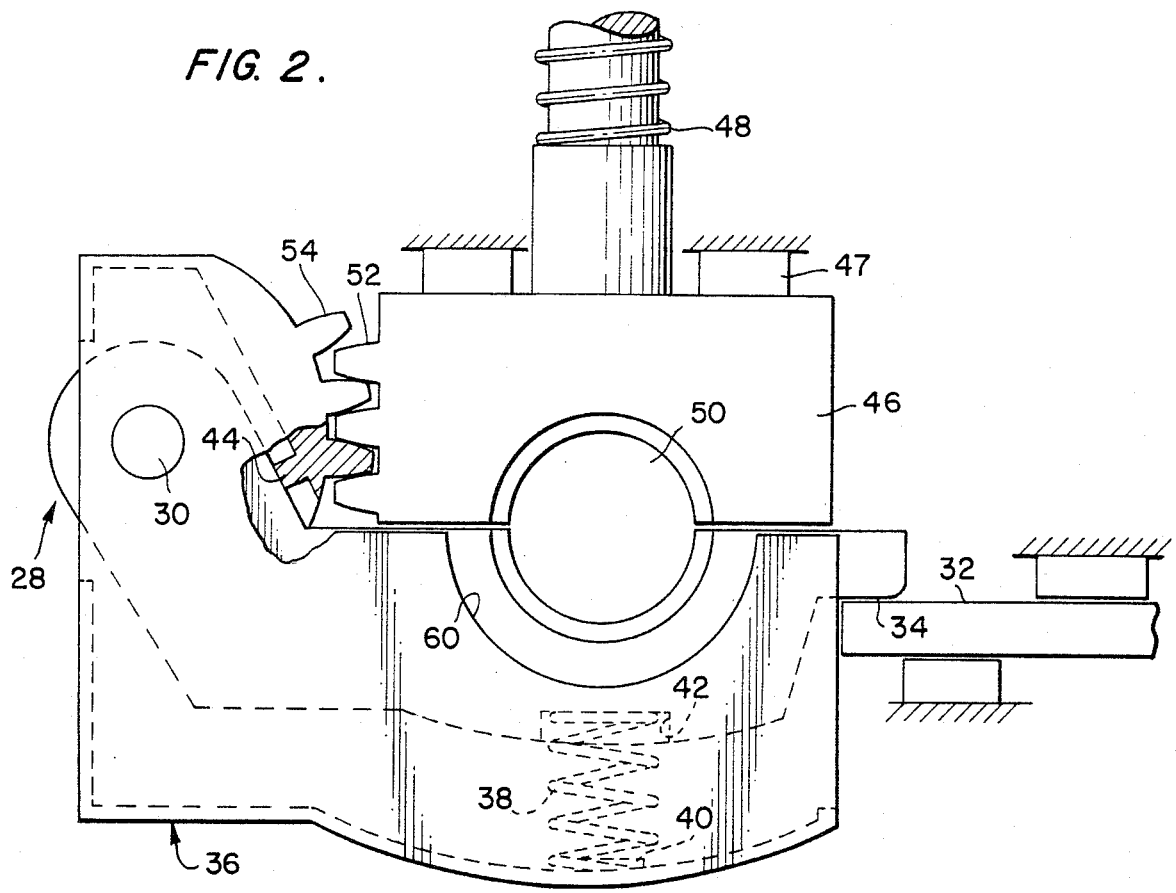
FIG. 2 is a plan view of a coupler incorporating the present invention.
Figure 3:
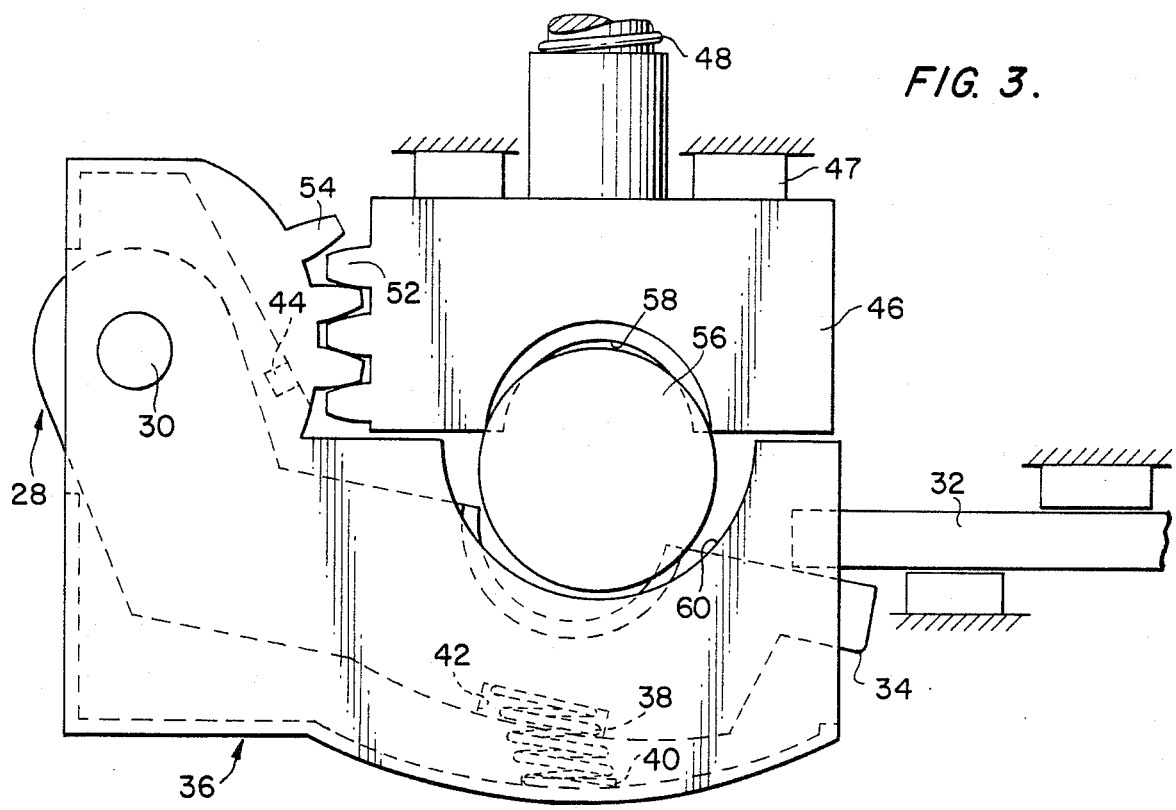
FIG. 3 is a change position view similar to FIG. 2.
Figure 4:
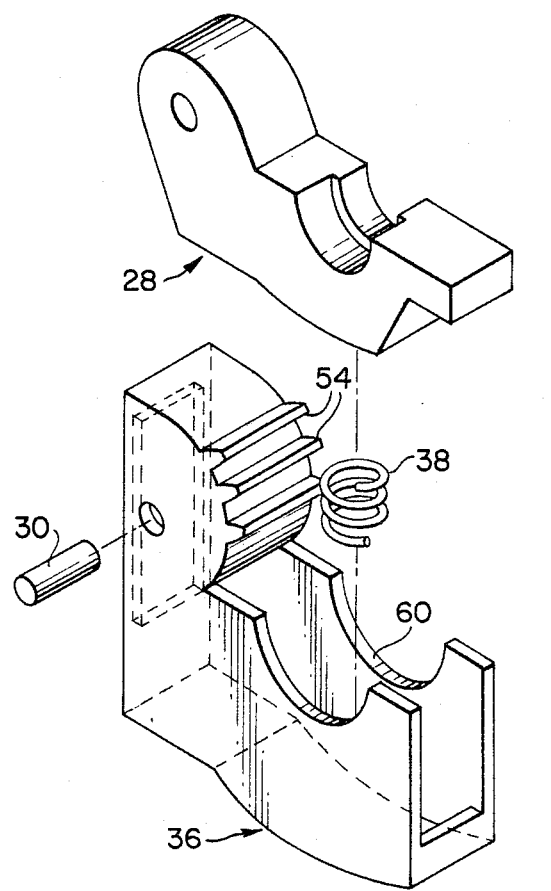
FIG. 4 is an exploded view of the coupler of FIGS. 2 and 3.

Referring now to FIGS. 2, 3 and 4 it will be seen that the jaw 28 is mounted on a pivot pin 30 for movement between an open position to one side of the path of movement of a king pin movable in a coupling direction to the closed position shown in FIG. 2 across said path of movement where a latch 32 may be automatically triggered to move to the latching position shown behind a shoulder 34 on the jaw, as in the prior art embodiment of FIG. 1. The jaw 28 is moved between its open and closed positions by separate jaw moving means which may comprise a member 36 pivoted on the same pivot pin 30 as the jaw member. Interposed between the jaw moving member 36 and the jaw 28 is a yielding connection which may be in the form of a coil spring 38 mounted at one end over a spring guide 40 on the floor of the member 36, which may be of a hollow, somewhat box-like construction, and within a blind recess 42 in the lower surface of the jaw 28, the latter being movably received within the member 36.

The spring 38 normally urges the member 36 and the jaw away from each other, movement in that direction being limited by stop means between them such as the stop 44 shown. Operating means for positively driving the jaw moving member comprises a plunger 46 which is urged by a spring 48 to an advanced position but is moved to the retracted position against limit stops 47 as shown in FIGS. 2 and 3 when engaged by the shank of a king pin 50 moving in a coupling direction. On one side of the plunger 46 are rack teeth 52 which meet with gear sector teeth 54 integral with the jaw moving member 36. The teeth 52, 54 are arranged that when the plunger is in its advanced position the jaw moving member 36 is positioned generally downwardly in FIGS. 2 and 3 with the stop 44 acting on the jaw 28 to move it clear to one side of the path of a king pin moving in a coupling direction. When the king pin engages the plunger it moves it towards its retracted position of FIGS. 2 and 3 and in so doing the jaw moving member 36 is swung to the horizontal position of FIG. 2 and, through the coil spring 38, moves the jaw 28 which is trapped between the spring and stop 44, to its closed position of FIG. 2 across the path of movement of the king pin to trigger the latch 32 so that it slides beneath the shoulder 34 to releasably lock the jaw in its towing position. It will be observed that due to the meshing engagement of the rack and gear sector teeth the jaw moving member 36 is positively driven between its jaw open and jaw closed positions as the plunger is moved between its advanced and retracted positions by the king pin.

In the event the plunger 46, instead of being engaged intermediate its ends by the shank of a king pin, is engaged by the lower flange 56 of a king pin as shown in FIG. 3. Though the flange is too large to enter the semi-circular shank-receiving recess 58 in the plunger, the flange nevertheless is capable of moving the plunger from its advanced towards its retracted position and in so doing it causes the jaw moving member 36 to be swung from a vertical towards a horizontal position which in turn causes the jaw to be moved, through the spring 38, in unison with the jaw moving member until the jaw engages the king pin flange as shown in FIG. 3. At this point the jaw can no longer follow the movement of the jaw moving member which continues to be positively driven by the oncoming king pin towards its position of FIG. 3 through the co-action of the meshed rack and gear sector teeth 52, 54, the spring 38 yielding as shown in FIG. 3 to permit movement of the jaw moving member independently of the jaw to the full extent of the movement of the king pin in a coupling direction.

In FIG. 3, the latch 32 is shown extended into a latching position. If the latch is triggered solely by movement of the jaw into its proper position of FIG. 2, then under conditions of FIG. 3, the latch would remain retracted to the right out of its latching position. On the other hand, it may be desirable to have the latch triggered by other means, such as by the jaw moving member, whereby the latch automatically extends, not to latch the jaw in its closed position but to positively prevent the jaw from moving to that position. This may be desirable should a king pin obstruction be located only momentarily in a position to hold back the jaw but then slips over the coupler to a position where the obstruction, which may be the lower, normal, SAE specified flange, nests in the recess at the top of the then-closed and locked jaw. By having the jaw moving member trigger the latch, rather than the jaw itself, the chance of the above taking place, though remote in any event, will be further minimized. This, of course, could not happen at all if the king pin is equipped with my patented flange. To be certain that any king pin obstruction never prevents the jaw moving member from moving to its full horizontal position the upper surface of the moving member is cut away to provide a recess 60 of sufficient extent that the member 36 cannot engage the obstruction.

Though the invention has been described as it applies to a modification of the Harris type coupler, it will be apparent that the salient features of the invention can be applied to a wide variety of couplers wherein a king pin is depended upon to positively drive jaw means to a king pin engaging position. Instead of the compression spring 38 which serves as the yielding means between the jaw and the mechanism which drives it, a wide variety of other types of yielding means such as a leaf spring, or a torsion spring which cooperates with the pivot 30, or elastomers could be used. Though the jaw moving member is shown as extending across the path of movement of the king pin, it could be shortened so that it always remains to one side of the path. Though desirably the jaw and jaw moving member have a common pivot pin, the jaw could, instead be pivoted separately to the jaw moving member. In short any arrangement is acceptable so long as mechanism which is positively driven by a king pin moving in a coupling direction has a yielding connection with the jaw member such that when the latter engages an obstruction and ceases to move, the mechanism can continue to operate to the full extent of the movement of the king pin in coupling direction. Thus the invention is susceptible of wide variety of changes and modifications without, however, departing from the scope and spirit of the appended claims.

What is claimed is:

1. A fifth wheel coupler comprising a jaw member mounted for movement between an open position to one side of the path of movement of a king pin movable in a coupling direction to a closed position across said path, latch means for releasably latching said jaw member in its closed position, jaw moving means separate from said jaw member, a yielding means biased between said jaw moving means and said jaw member, and operating means for positively driving said jaw moving means in response to movement of a king pin in a coupling direction, said yielding means enabling said jaw moving means to continue to be moved by said operating means by deformation of said yielding means in response to movement of a king pin in a coupling direction when said jaw member is prevented from moving to its closed and latched positions by engagement with an obstruction on said king pin during continued movement of said king pin in a coupling direction.

2. The fifth wheel coupler of claim 1, wherein said jaw member comprises a jaw having one end pivoted to one side of said path of movement of a king pin and a free end engageable by said latch means when said jaw is moved to its closed position across said path of movement, and said jaw moving means comprises an element pivoted to the same side of said path of movement as said jaw member, said operating means for positively driving said element comprising a movable part engageable by a king pin as it moves in a coupling direction and having a positive operative connection with said pivoted element to swing it, and said jaw member, through said yielding means, from its open towards its closed position.

3. The fifth wheel coupler of claim 2, wherein said jaw member and said element have a common pivot.

4. The fifth wheel coupler of claim 2, wherein said movable part engageable by a king pin as it moves in a coupling direction comprises a plunger normally occupying an advanced position but movable by said king pin to a retracted position, and said operative connection comprises rack teeth on one side of said plunger and gear sector teeth on said pivoted element meshing with said rack teeth, said teeth being arranged that when said plunger is in its advanced position said jaw is engaged by said pivoted element for location in its open position, and as said plunger is moved towards its retracted position said pivoted element is operated to move said jaw through said yielding means towards said closed position.

5. The fifth wheel coupler of claim 2, wherein said pivoted element is cut away so that it cannot be prevented from moving to the full extent of its range of movement by engagement with an obstruction on a king pin.

6. The fifth wheel coupling of claim 2, wherein said yielding means is interposed between said jaw and said pivoted element and operates on said jaw and said element tending to move then relatively away from each other, and stop means between said jaw and said element limiting relative movement away from each other, said jaw being normally trapped between said yieldable means and said stop means for conjoint movement with said element until such time as said jaw encounters an oversize obstruction to prevent said jaw from closing upon which occurrence said yielding means yields.

7. A fifth wheel coupler comprising a jaw member mounted for movement between an open position to one side of the path of movement of a king pin movable in a coupling direction to a closed position across said path, a mechanism operable by a king pin during its movement in a coupling direction for driving said jaw to its closed position, and yielding means biased between said mechanism and said jaw enabling said mechanism to continue to be operated by said king pin to the full extent of its movement in a coupling direction when said jaw is prevented from moving to its closed position by engagement with an obstruction on said king pin.

* * * * *